United States Patent
Rusinque (10) Patent No.: US 10,265,993 B1
(45) Date of Patent: Apr. 23, 2019

(54) CONVERTIBLE CARD AND ELECTRONIC DEVICE STAND

(71) Applicant: Jopher Rusinque, Miami, FL (US)

(72) Inventor: Jopher Rusinque, Miami, FL (US)

( * ) Notice: Subject to any disclaimer, the term of this patent is extended or adjusted under 35 U.S.C. 154(b) by 0 days.

(21) Appl. No.: 15/974,805

(22) Filed: May 9, 2018

Related U.S. Application Data (60) Provisional application No. 62/503,752, filed on May 9, 2017.

(51) Int. Cl.
*B42D 25/21* (2014.01)
*F16M 13/06* (2006.01)
*H04M 1/04* (2006.01)

(52) U.S. Cl.
CPC ............. *B42D 25/21* (2014.10); *F16M 13/06* (2013.01); *H04M 1/04* (2013.01); *F16M 2200/08* (2013.01)

(58) Field of Classification Search
CPC ......... A47B 2220/0019; A47B 23/042; H04M 1/04; B42D 25/21
See application file for complete search history.

(56) References Cited

U.S. PATENT DOCUMENTS

| | | | | |
|---|---|---|---|---|
| 4,460,146 A | * | 7/1984 | Raggiotti | A47G 1/24 248/456 |
| 4,674,724 A | * | 6/1987 | Gaudet | A47B 23/044 248/459 |
| 6,848,665 B1 | * | 2/2005 | Wu | B43M 99/00 248/174 |
| D622,274 S | * | 8/2010 | Green | D14/447 |
| 7,861,995 B2 | * | 1/2011 | Liou | F16M 11/105 248/454 |
| 8,100,376 B2 | * | 1/2012 | Ye | A47B 23/043 248/454 |
| D703,658 S | * | 4/2014 | Higashi | D14/253 |
| 8,746,638 B2 | * | 6/2014 | Carney | H04M 1/0202 248/176.1 |
| 8,910,915 B2 | * | 12/2014 | Wibby | A47B 23/043 206/45.2 |
| 8,950,720 B1 | * | 2/2015 | Carr | A47B 23/044 248/454 |
| 9,022,341 B2 | * | 5/2015 | Radmard | F16M 11/00 248/558 |
| 9,249,922 B2 | * | 2/2016 | Haarburger | F16M 11/38 |
| 9,303,810 B2 | * | 4/2016 | Adams | F16M 11/38 |
| 9,308,767 B1 | * | 4/2016 | Waldron | B42D 15/042 |

(Continued)

*Primary Examiner* — Bradley Duckworth
(74) *Attorney, Agent, or Firm* — H. John Rizvi; John Rizvi, P.A.

(57) ABSTRACT

A convertible card and electronic device stand includes a card body fabricated of a flexible material. A pair of stand arms formed within the card body, oriented towards one another from opposite side portions of the card body. The card body is selectively deployable from an initially flat configuration in which the stand arms and remainder of the card body are arranged coplanar with each other, into a deformed, electronic device stand configuration. In the electronic device stand configuration, an electronic device opening is formed in the card body by flexing the stand arms away from a remainder of the card body; in turn, the remainder of the card body is arranged in a bowed configuration and the stand arms are interlocked with each other to secure the remainder of the card body in the bowed configuration.

20 Claims, 5 Drawing Sheets

(56) References Cited

U.S. PATENT DOCUMENTS

| | | | |
|---|---|---|---|
| 9,346,309 B2 * | 5/2016 | Harris | B42D 3/06 |
| 2010/0090085 A1 * | 4/2010 | Corrion | A47B 23/043 |
| | | | 248/459 |
| 2011/0278421 A1 * | 11/2011 | Guldalian | A47B 23/00 |
| | | | 248/459 |
| 2013/0270413 A1 * | 10/2013 | Wilber | F16M 11/00 |
| | | | 248/558 |
| 2017/0023980 A1 * | 1/2017 | Marseille | G06F 1/1656 |

* cited by examiner

CONVERTIBLE CARD AND ELECTRONIC DEVICE STAND

CROSS-REFERENCE TO RELATED APPLICATION

This application claims the benefit of U.S. Provisional Patent Application Ser. No. 62/503,752, filed on May 9, 2017, which is incorporated herein in its entirety.

FIELD OF THE INVENTION

The present invention relates generally to cellphones and other personal electronic devices, and more particularly, to a convertible card and electronic device stand which can be used as a business card, credit/debit card or the like and selectively deformed into an electronic device stand to support a cellphone or other personal electronic device in a generally upright position on a support surface.

BACKGROUND OF THE INVENTION

Cellphones, particularly smartphones, are in widespread use in today's world. In normal usage, a smartphone user may store and carry the smartphone in a pocket or purse. In the event that the smartphone receives a call, text or other notification, the user must expeditiously locate and handle the smartphone for the purpose of receiving the call or responding to the text or other notification.

In other situations, the user may place the smartphone on a table or other flat surface. To facilitate placing the smartphone in a more readable position, the smartphone is often placed or fitted into a cellphone stand which holds the smartphone in an upright position, with the screen oriented towards the user.

Smartphones additionally have the capability of displaying all types of media and graphics including video. Videos are typically viewed in landscape orientation in which the smartphone is disposed in a horizontal position. As the video is played, the smartphone may be held by the user, which may be tiring or cumbersome, particularly in the event that the video has a protracted length. Alternatively, the user may place the smartphone on a stand, as described heretofore.

Cellphone stands come in various shapes, sizes and configurations, and are generally separate and rather bulky accessories. Some cellphone stands also provide means for charging the smartphone when fitted onto the stand.

Accordingly, there is an established need for a cellphone stand which is less bulky and easier to carry and store than conventional cellphone stands, and yet is equally able to stably support a cellphone on a support surface.

SUMMARY OF THE INVENTION

The present invention is directed to a convertible card and electronic device stand which can be used as a business card, credit/debit card or the like, and selectively deployed as an electronic device stand to support a cellphone or other personal electronic device in a generally upright position on a support surface. The convertible card and electronic device stand includes a flexible card body. A card body of the convertible card and electronic device stand may be fabricated, for instance, of a flexible cardstock or plastic material and may have the dimensions of a standard or conventional business card or credit/debit card. Information about products and/or services offered by a business proprietor, employee or other service or product provider may be provided on the card body. A pair of stand arms may be formed within the card body, oriented towards one another from opposite side portions of the card body. The stand arms may be delimited by initially untorn, tearable score lines in the card body. The card body can adopt a flat, card configuration in which the stand arms and remainder of the card body are arranged coplanar with each other. The card body can be deformed into an electronic device stand configuration by deforming the card body into a bowed or flexed configuration and interlocking the stand arms with each other. An elongated electronic device opening is formed by the space from which the stand arms are detached and extended from the card body. The interlocked stand arms support the electronic device stand on a table or other support surface, and the electronic device opening receives and accommodates a cellphone or other electronic device of a user as the electronic device stand supports the electronic device in a generally upright position on the surface. The electronic device can be operated in sleep or standby mode to receive phone calls, text messages and/or notifications, or can be operated in video mode to display a video on the screen of the smartphone for viewing by the user.

In an illustrative embodiment of the invention, a convertible card and electronic device stand, which can be used as a business card, credit/debit card or the like, and selectively deployed as an electronic device stand to support a cellphone or other electronic device in a generally upright position on a support surface, comprises a flexible card body and a pair of stand arms formed within the card body and oriented towards one another from opposite side portions of the card body. The card body can adopt a flat configuration in which the stand arms and remainder of the card body are arranged coplanar with each other. The card body can further adopt a deformed, electronic device stand configuration in which the stand arms are flexed away from the remainder of the card body thereby defining an elongated opening in the card body, and further in which the remainder of the card body is arranged in a bowed configuration and the stand arms are interlocked with each other to secure the remainder of the card body in the bowed configuration.

In a second aspect, when the card body is arranged in the deformed, electronic device stand configuration, opposite edges of the card body can be configured to rest on a flat surface with the bowed body extending upward therefrom. The interlocked stand arms can be arranged beneath and in a spaced/apart relationship with the opening in the card body.

In another aspect, when the card body is arranged in the deformed, electronic device stand configuration, the interlocked stand arms can be elevated with respect to the opposite edges of the card body.

In another aspect, the stand arms can be interlocked by an arm tab of one stand arm engaging with a tab opening in the other stand arm.

In another aspect, the stand arms can be attached to the remainder of the card body by scored lines in the flat configuration. In the deformed, electronic device stand configuration, the scored lines can be torn allowing the stand arms to be flexed away.

In another aspect, the convertible card and electronic device stand can further include perforated arm distal portion score lines in the card body, the arm distal portion score lines outlining a respective distal portion of each stand arm.

In another aspect, the convertible card and electronic device stand can further include perforated arm tab score lines in the distal portions of the stand arms, the arm tab score lines outlining an arm tab in each stand arm.

In another aspect, the convertible card and electronic device stand can further include diverging perforated arm base score lines outlining a pair of arm bases for the respective arm distal portions. The pair of arm bases can be formed in the card by tearing the card along the arm base score lines.

In another aspect, the card body can further include a perforated arm separating score line between the arm distal portions.

In another aspect, the card body in the flat configuration can be elongated and rectangular in shape.

In another aspect, the card body in the deformed, electronic device stand configuration can have an A-shape when observed in side elevation view.

In another aspect, the card body can be made of an elastic material and can be elastically biased to recover the flat configuration when the arms are disengaged with one another.

In another aspect, information about products and/or services of a business proprietor, employee or other service or product provider can be provided on the card body.

In another aspect, at least one of a logo and an image can be provided on the card body.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 1 presents a top plan view of a convertible card and electronic device stand in accordance with an illustrative embodiment of the invention, the convertible card and electronic device stand shown in a flat configuration in which the convertible card and electronic device stand can serve as a business card, credit/debit card or the like;

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a convertible card and electronic device stand which can be used as a business card, credit/debit card or the like, and selectively deployed as an electronic device stand to support a cellphone or other personal electronic device on a support surface.

Figure 1:
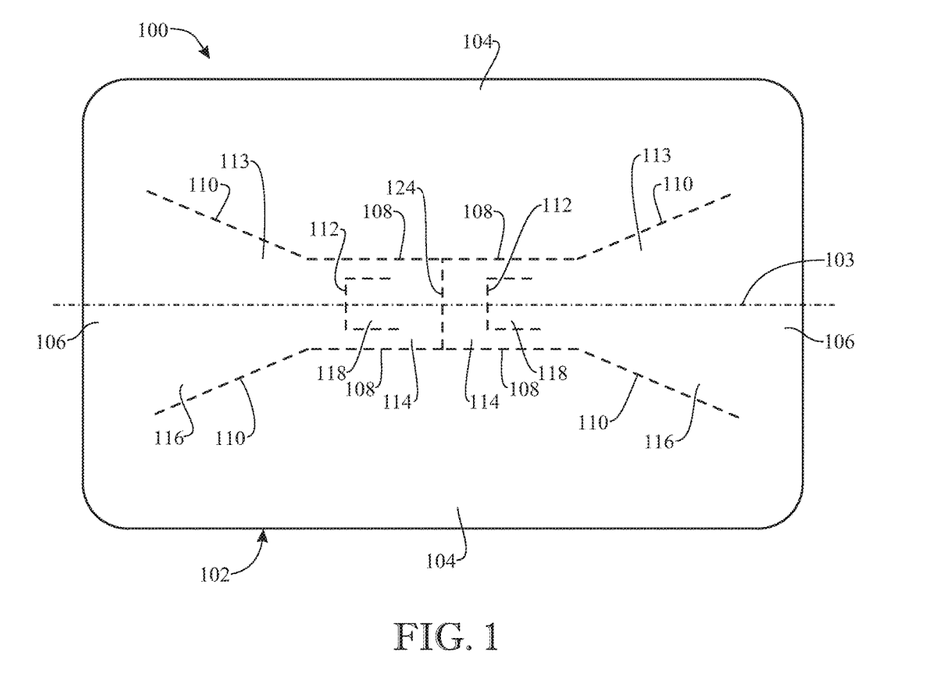
Figure 2:
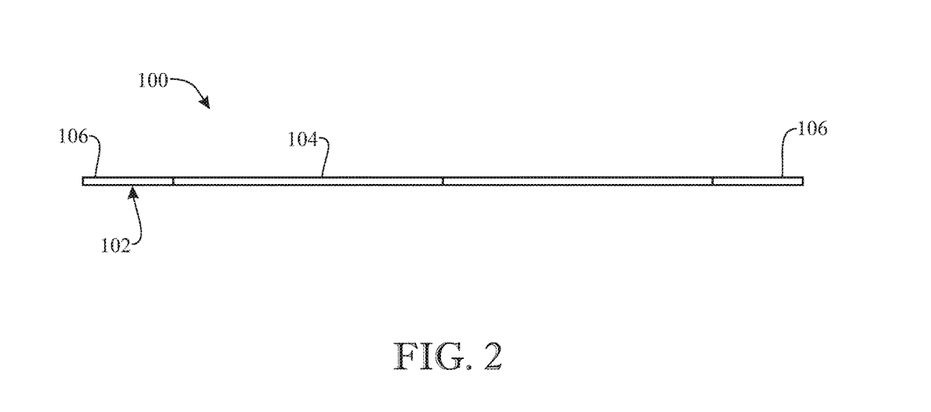
FIG. 2 presents a side elevation view of the convertible card and electronic device stand illustrated in FIG. 1.

Referring initially to FIGS. 1 and 2, a convertible card and electronic device stand 100 which can be used as a business card, credit/debit card or the like, and selectively deployed as an electronic device stand to support a cellphone 126 (FIGS. 6 and 7) on a support surface is illustrated. The convertible card and electronic device stand 100 includes a relatively thin and flat, flexible card body 102. In some embodiments, the card body 102 may be generally elongated and rectangular in shape, and may have the dimensions of a standard or conventional business card or credit/debit card. The card body 102 may optionally include one or more rounded corners. For instance, the depicted card body 102 is rectangular and has four rounded corners. The card body 102 may include a pair of elongated side card portions 104 and a pair of longitudinal end card portions 106 extending between and at opposite longitudinal ends of the side card portions 104.

As will be described hereinafter, the convertible card and electronic device stand 100 can be used as a conventional business card, credit/debit card or the like. Similarly to conventional business cards and credit/debit cards, the convertible card and electronic device stand 100 can be highly customizable in appearance and may include striking visual designs. For this purpose, the card body 102 of the convertible card and electronic device stand 100 can be fabricated of plastic, cardstock or other applicable material. Information (not illustrated) about products and/or services offered by a business proprietor, employee or other service or product provider may be printed, stamped and/or otherwise provided on the card. In some embodiments, the information may include logos and/or images. For instance, the card may include a product or service provider's name, company, business affiliation, logo and contact information including a street address, telephone number, fax number, email address and website.

As illustrated in FIG. 1, the card body 102 comprises a set of perforated scored lines configured to allow the selective tearing or separation thereof of a pair of stand arms. More specifically, on the left and right longitudinal sides of the card body 102, near the left and right side card portions 104, respectively, the card body 102 comprises a respective stand arm 113. Each stand arm 113 can include an arm distal portion 114 and an arm base 116. The arm distal portion 114 is delimited by perforated, arm distal portion score lines 108 and the arm base 116 is delimited by perforated, arm base score lines 110. The stand arms 113 may be disposed adjacent and oriented towards one another in the card body 102, and may be arranged in an end-to-end relationship to each other in which the distal ends of the arm distal portions 114 contact one another. A perforated arm-separating score line 124 in the card body 102 may delineate or separate the arm distal portions 114 from each other. Each stand arm 113 may have a longitudinal axis which is oriented parallel to a longitudinal axis 103 of the card body 102. In the present embodiment, each arm distal portion 114 is delimited by a U-shaped score line set comprised of top and bottom arm distal portion score lines 108 and the end arm separating score line 124. As shown, the U-shaped score line set can be formed with right angles; i.e., the end arm separating score line 124 can be perpendicular to the top and bottom arm distal portion score lines 108, which in turn can be parallel to one another. However, alternative embodiments are contemplated as to the exact shape of the arm distal portions 114.

Perforated arm tab score lines 112 may be provided in the card body 102 in each of the pair of arm distal portions 114. The arm tab score lines 112 may each outline an arm tab 118. The arm tabs 118 are spaced apart from one another in the longitudinal direction of the longitudinal axis 103. As shown, the arm tabs 118 are formed facing the same direction; in the present illustration of FIG. 1, for instance, the arm tabs 118 are formed in a leftward orientation.

In some embodiments, as shown, the arm bases 116 are wider than the arm distal portions 114. For instance, the arm base score lines 110 may diverge from each other in a V-type arrangement as they extend from the respective arm distal portion score lines 108 of each arm distal portion 114 toward the respective end card portions 106. Each arm base 116 may be continuous with an end card portion 106 at a corresponding end of the card body 102. In deployment of the card body 102 as an electronic device stand, which will be hereinafter described, the arm bases 116 may enhance the strength and rigidity of the respective arm distal portions 114.

Initially, the convertible card and electronic device stand 100 can be arranged in a flat, non-deformed position as shown in FIGS. 1 and 2, with the stand arms 113 and the remainder of the card body 102 arranged in coplanar relationship with each other as shown in FIG. 2 and with the score lines 108, 110, 112, 124 untorn. In this position, the convertible card and electronic device stand 100 can be used similarly to conventional business cards, of the kind that are commonly used by business proprietors, employees or other service or product providers to display and distribute products and/or services which are offered by the product or service provider. A product or service provider may share the convertible card and electronic device stand 100 with a potential customer or client or a new acquaintance in a social, business or other setting. In other applications, the convertible card and electronic device stand 100 can be used as a credit/debit card, and include the necessary chip(s), magnetic band(s) or other information storage means.

Figure 3:
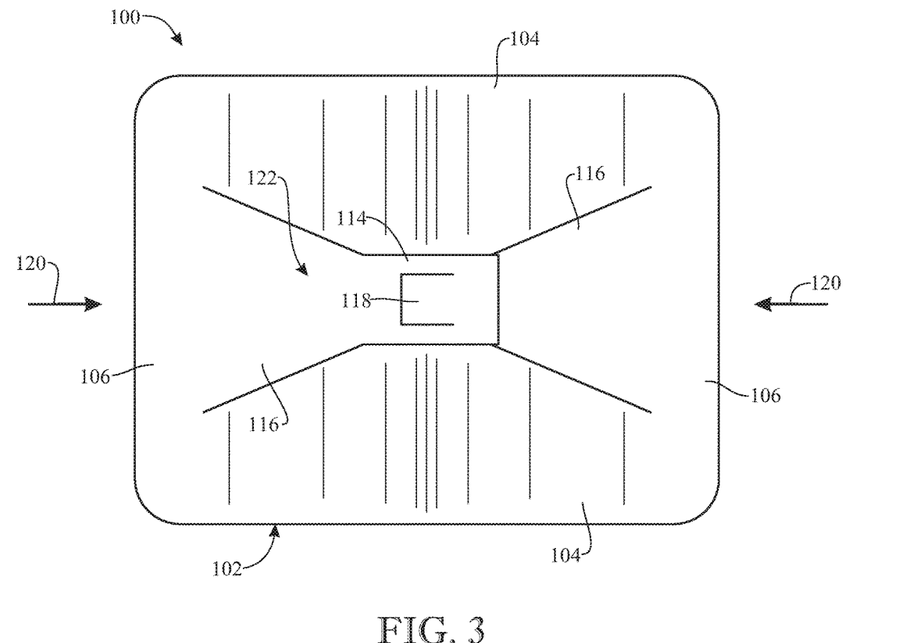
FIG. 3 presents a top plan view of the convertible card and electronic device stand being bowed or flexed and stand arms being extended towards one another and overlapped with one another in order for the convertible card and electronic device stand to adopt an electronic device stand configuration.
Figure 4:
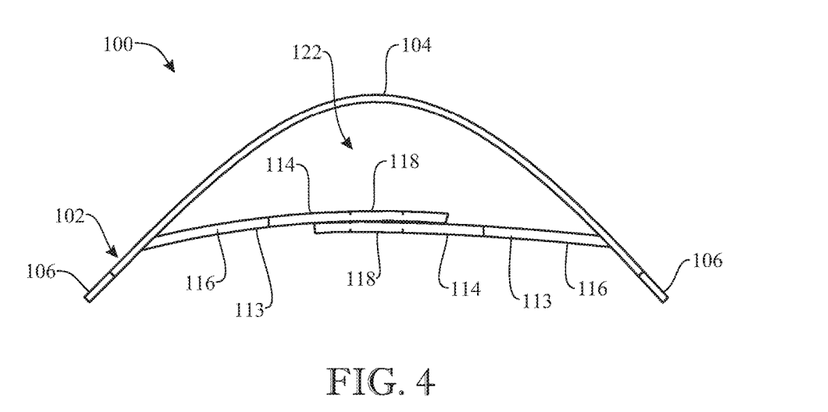
FIG. 4 presents a side elevation view of the convertible card and electronic device stand illustrated in FIG. 3.
Figure 5:
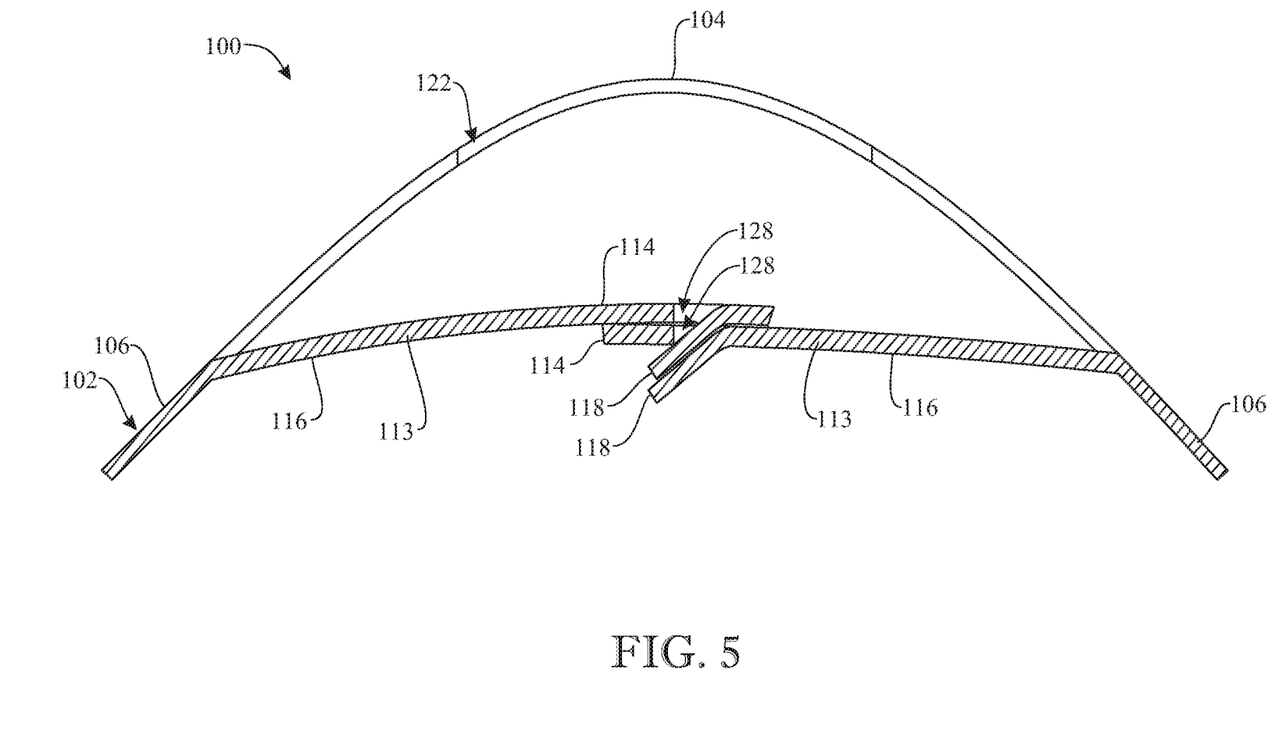
FIG. 5 presents a cross-sectional side elevation view of the convertible card and electronic device stand in the electronic device stand configuration, with the stand arms interlocking with each other to retain the remainder of the convertible card and electronic device stand in the bowed or flexed configuration.

Referring next to FIGS. 3-7, the card body 102 can be selectively deployed into a three-dimensional configuration in which the card body 102 serves as an electronic device stand for supporting a cellphone 126 on a flat surface (not illustrated), typically as follows. The card body 102 may be torn along the arm distal portion score lines 108 and the arm separating score line 124 (FIG. 1) and the arm distal portions 114 extended from the card body 102. In like manner, the card body 102 may be torn along the arm base score lines 110 and the arm bases 116 extended from the card body 102. In other words, the stand arms 113 are torn and extended from the remainder of the card body 102. The card body 102 may also be torn along the arm tab score lines 112 and the arm tabs 118 extended from the respective arm distal portions 114. As illustrated in FIG. 5, tab openings 128 are formed in the respective arm distal portions 114 as the arm tabs 118 are torn from the card body 102 along the respective arm tab score lines 112.

Figure 6:
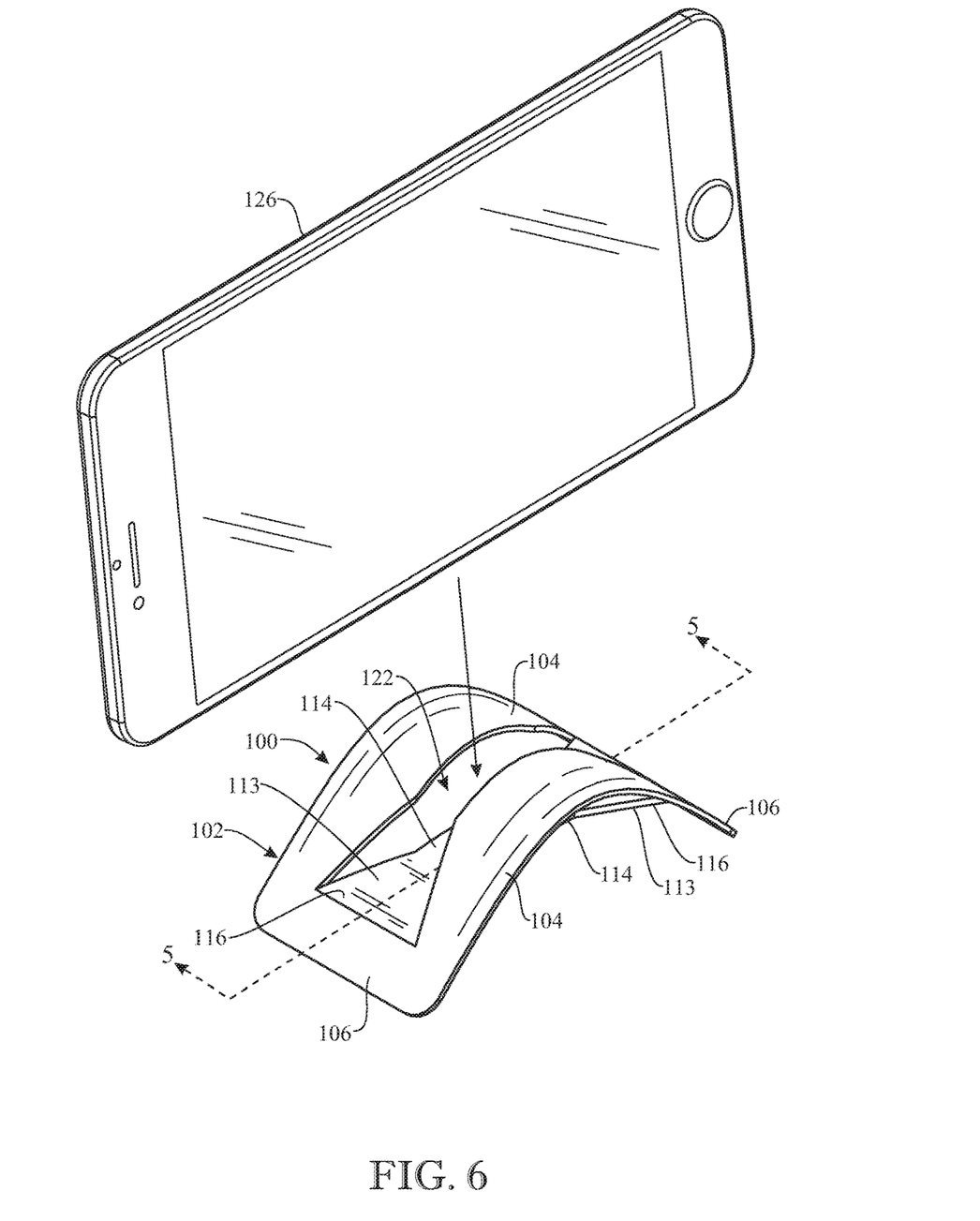
FIG. 6 presents a top front isometric view of the convertible card and electronic device stand in the electronic device stand configuration of FIG. 5, illustrating a cellphone being fitted into the electronic device stand.
Figure 7:
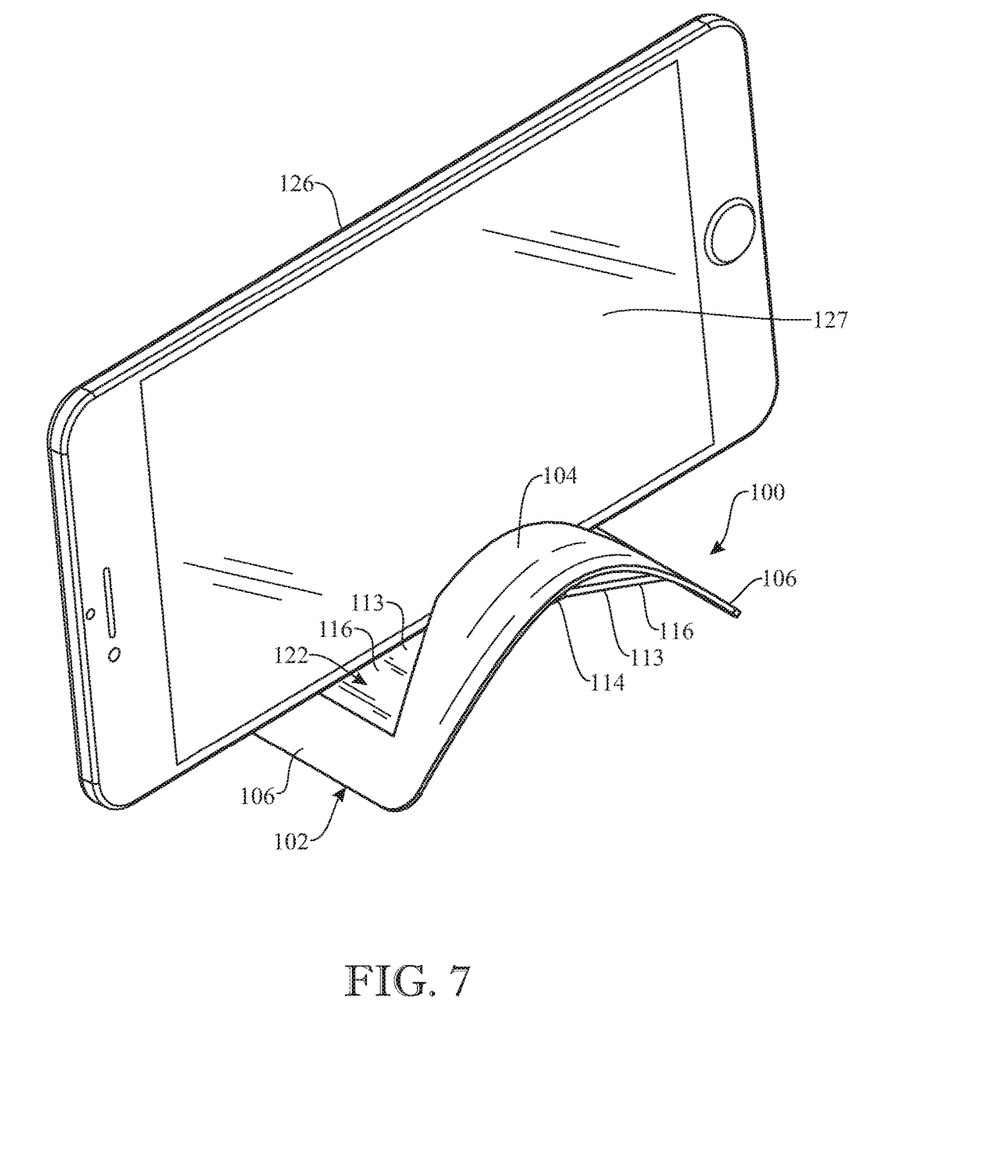
FIG. 7 presents a top front isometric view of the cellphone placed in and supported by the convertible card and electronic device stand.

Next, the card body 102 may be deformed into an arched, bowed or flexed configuration by pushing the end card portions 106 inwardly toward each other, as indicated by the push arrows 120 in FIG. 3. The end card portions 106 are pushed towards one another until the arm tabs 118 are arranged in vertical registration with one another, as shown in FIG. 4. The card body 102 may be secured in this bowed or flexed configuration by interlocking the arm tabs 118 at the tab openings 128. For instance, as shown in FIG. 5, the arm tab 118 of the arm distal portion 114 of the top stand arm 113 may be inserted through and interlocked with the tab opening 128 of the arm distal portion 114 of the bottom stand arm 113 (alternatively, the bottom arm tab 118 could be interlocked with the top tab opening 128). In the secured position shown in FIG. 5, the card body 102 has adopted a generally A-shaped configuration if observed in side elevation (or cross-sectional side elevation, as shown). As illustrated in FIGS. 5-7, an elongated electronic device opening 122 is formed in the card body 102 in the location which was originally occupied by the untorn stand arms 113, i.e. in place of the arm distal portions 114 and the arm bases 116. As further shown in FIGS. 5-7, the interlocking stand arms 113 are disposed beneath the electronic device opening 122 providing a base or floor beneath the electronic device opening 122. The convertible card and electronic device stand 100 may then be placed on a flat support surface (not illustrated), with outer edges of the end card portions 106 resting on the support surface while the interlocked stand arms 113 are elevated from the support surface. As illustrated in FIGS. 6 and 7, the cellphone 126 can then be placed in the electronic device opening 122, either in landscape orientation, as illustrated, or in an upright orientation, with the stand arms 113 supporting the weight of the cellphone 126 and elevating the cellphone 126 so that the cellphone screen 127 is arranged above (and uncovered by) the card body 102 in its practical entirety, while the front and back side card portions 104 stabilize the cellphone 126 and prevent it from swaying frontward and backward. Thus, in sleep or standby mode, the cellphone 126 can be readily accessed by the user in the event that the cellphone 126 receives a telephone call, text message or other notification. Alternatively, the user may be able to view a video as it is played on the cellphone 126.

In typical application, a business proprietor, employee or other service or product provider (not illustrated) may carry a supply of multiple convertible card and electronic device stands 100 in the flat, card configuration. The product or service provider may share or distribute the convertible card and electronic device stands 100 to potential customers, clients, new acquaintances or other users in a social, business or other setting, and the users may keep the convertible card and electronic device stands 100 for future use. The users may keep and later refer to the information on the convertible card and electronic device stands 100 for the purpose of contacting the product or service provider for products and/or services offered by the product or service provider. The users may also manipulate the convertible card and electronic device stands 100 to obtain an electronic device stand to support their phones.

More specifically, a user may elect to deploy his or her card body 102 to form an electronic device stand typically in the manner which was heretofore described with respect to FIGS. 3-7. Accordingly, the user may place his or her cellphone 126 in the electronic device opening 122 of the convertible card and electronic device stand 100 for the purpose of readily accessing the cellphone 126 in the event that the cellphone 126 receives a telephone call, text message or other notification or for the purpose of viewing a video as it is played on the cellphone 126.

In some embodiments, the card body 102 can be made of an elastic material so that the card body 102 recovers its original, flat configuration of FIG. 1 when the user disengages the arm tabs 118 and tab openings 128. In other words, in these embodiments, the convertible card and electronic device stand 100 can selectively and reversibly switch between the flat, card configuration of FIG. 1 and the three-dimensional, electronic device stand configuration of FIGS. 6 and 7.

In summary, the present invention provides a cellphone or electronic device accessory which solves the problem of providing a smartphone stand which is less bulky and much easier to store and carry than conventional cellphone stands. Furthermore, the accessory can include text and/or graphics and be used as a business card, credit/debit card or the like when in the non-deformed, flat state of FIG. 1.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A convertible card and electronic device stand which can be used as a card and selectively deployed as an electronic device stand to support a cellphone or other electronic device on a surface, comprising:
   a flexible card body;
   a pair of stand arms formed within the card body, oriented towards one another from opposite side portions of the card body; wherein
   the card body can adopt:
      a flat configuration in which the stand arms and remainder of the card body are arranged coplanar with each other, and
      a deformed, electronic device stand configuration in which the stand arms are flexed away from the remainder of the card body thereby defining an elongated opening in the card body, and further in which the remainder of the card body is arranged in a bowed configuration and the stand arms are interlocked with each other to secure the remainder of the card body in the bowed configuration.

2. The convertible card and electronic device stand of claim 1, wherein, when the card body is arranged in the deformed, electronic device stand configuration, opposite edges of the card body are configured to rest on a flat surface with the bowed body extending upward therefrom, and the interlocked stand arms are arranged beneath and in a spaced/apart relationship with the opening in the card body.

3. The convertible card and electronic device stand of claim 2, further wherein, when the card body is arranged in the deformed, electronic device stand configuration, the interlocked stand arms are elevated with respect to the opposite edges of the card body.

4. The convertible card and electronic device stand of claim 1, wherein the stand arms are interlocked by an arm tab of one stand arm engaging with a tab opening in the other stand arm.

5. The convertible card and electronic device stand of claim 1, wherein the stand arms are attached to the remainder of the card body by scored lines in the flat configuration, and further wherein, in the deformed, electronic device stand configuration, the scored lines are torn allowing the stand arms to be flexed away.

6. The convertible card and electronic device stand of claim 5, wherein the convertible card and electronic device stand further comprises perforated arm distal portion score lines in the card body, the arm distal portion score lines outlining a respective distal portion of each stand arm.

7. The convertible card and electronic device stand of claim 6, wherein the convertible card and electronic device stand further comprises perforated arm tab score lines in the distal portions of the stand arms, the arm tab score lines outlining an arm tab in each stand arm.

8. The convertible card and electronic device stand of claim 6, wherein the convertible card and electronic device stand further comprises diverging perforated arm base score lines outlining a pair of arm bases for the respective arm distal portions, and further wherein the pair of arm bases are formed in the card by tearing the card along the arm base score lines.

9. The convertible card and electronic device stand of claim 6, wherein the card body further comprises a perforated arm separating score line between the arm distal portions.

10. The convertible card and electronic device stand of claim 1, wherein the card body in the flat configuration is elongated and rectangular in shape.

11. The convertible card and electronic device stand of claim 1, wherein the card body in the deformed, electronic device stand configuration has an A-shape when observed in side elevation view.

12. The convertible card and electronic device stand of claim 1, wherein the card body is made of an elastic material and is elastically biased to recover the flat configuration when the arms are disengaged with one another.

13. The convertible card and electronic device stand of claim 1, wherein information about products and/or services of a business proprietor, employee or other service or product provider is provided on the card body.

14. The convertible card and electronic device stand of claim 1, wherein at least one of a logo and an image is provided on the card body.

15. A convertible card and electronic device stand which can be used as a card and selectively deployed as an electronic device stand to support a cellphone or other electronic device on a surface, comprising:
   a flexible card body;
   a pair of stand arms formed within the card body, oriented towards one another from opposite side portions of the card body; wherein
   the card body can adopt:

a flat configuration in which the stand arms and remainder of the card body are arranged coplanar with each other, and a deformed, electronic device stand configuration in which the stand arms are flexed away from the remainder of the card body thereby defining an elongated opening in the card body, and further in which the remainder of the card body is arranged in a bowed configuration and the stand arms are interlocked with each other to secure the remainder of the card body in the bowed configuration, and further in which opposite edges of the card body are configured to rest on a flat surface with the bowed body extending upward therefrom, and the interlocked stand arms are arranged beneath and in a spaced/apart relationship with the opening in the card body.

16. The convertible card and electronic device stand of claim 15, wherein the card body in the flat configuration is elongated and rectangular in shape.

17. The convertible card and electronic device stand of claim 15, wherein the card body in the deformed, electronic device stand configuration has an A-shape when observed in side elevation view.

18. A convertible card and electronic device stand which can be used as a card and selectively deployed as an electronic device stand to support a cellphone or other electronic device on a surface, comprising:

a flexible card body;

a pair of stand arms formed within the card body, oriented towards one another from opposite side portions of the card body; wherein the card body can adopt:

a flat configuration in which the stand arms and remainder of the card body are arranged coplanar with each other and are attached to the remainder of the card body by scored lines, and a deformed, electronic device stand configuration in which the scored lines are torn and the stand arms are flexed away from the remainder of the card body thereby defining an elongated opening in the card body, and in which the remainder of the card body is arranged in a bowed configuration and the stand arms are interlocked with each other to secure the remainder of the card body in the bowed configuration, and further in which opposite edges of the card body are configured to rest on a flat surface with the bowed body extending upward therefrom, and the interlocked stand arms are arranged beneath and in a spaced/apart relationship with the opening in the card body.

19. The convertible card and electronic device stand of claim 18, wherein the card body in the flat configuration is elongated and rectangular in shape.

20. The convertible card and electronic device stand of claim 19, wherein the card body is made of an elastic material and is elastically biased to recover the flat configuration when the arms are disengaged with one another.

* * * * *